US005464295A

United States Patent [19]

Daillot

[11] Patent Number: 5,464,295
[45] Date of Patent: Nov. 7, 1995

[54] ARTICULATED FRAME ELEMENT FOR MODULAR FURNITURE, AND HINGE FOR ARTICULATING TWO FRAME ELEMENTS TOGETHER

[76] Inventor: Jean-Jacques Daillot, 4 Hautgoutte,, 88520 Ban De La Veline, France

[21] Appl. No.: 131,402

[22] Filed: Oct. 1, 1993

[30] Foreign Application Priority Data

Oct. 2, 1992 [FR] France .................................. 92 12106

[51] Int. Cl.[6] .................................................. F16C 11/00

[52] U.S. Cl. ............................ 403/84; 312/111; 403/110; 403/340; 403/341; 403/405.1

[58] Field of Search ............................ 16/282, 366, 367, 16/368; 312/107, 111; 403/84, 85, 87, 110, 339, 340, 341, 405.1, 407.1

[56] References Cited

U.S. PATENT DOCUMENTS

| | | | |
|---|---|---|---|
| 2,881,017 | 4/1959 | Millar, Jr. | 403/340 |
| 3,053,558 | 9/1962 | Challas, Jr. et al. | 312/111 X |
| 3,938,296 | 2/1976 | Weiss | 312/111 |
| 4,881,843 | 11/1989 | Randleman | 403/92 |

*Primary Examiner*—Randolph A. Reese
*Assistant Examiner*—Andrea Chop
*Attorney, Agent, or Firm*—Weiser & Associates

[57] ABSTRACT

A hinge for articulatable elements, particularly for a frame element of modular furniture, includes two articulation elements of identical semi-S-shaped profile placed in converse relative position to one another. The respective external lateral surfaces of the elements are placed in an abutting relation so as to allow movement of the elements during installation. The semi-S-shaped profile of the elements includes a convex portion traversed by a bore, and a concave portion. At least one structure is provided for fixing the elements to an upright. The hinge also includes two locking rods, each rod having two bosses. The locking rods are placed on opposing front and back surfaces of the elements so that each of their respective bosses are placed in the respective bores of the two elements. The bosses are additionally traversed by assemblies for receiving a clamping device.

11 Claims, 3 Drawing Sheets

ARTICULATED FRAME ELEMENT FOR MODULAR FURNITURE, AND HINGE FOR ARTICULATING TWO FRAME ELEMENTS TOGETHER

BACKGROUND OF THE INVENTION

The invention relates to a hinge for articulatable elements, particularly for a frame element of modular furniture, and also relates to the articulatable element equipped with such a hinge.

A frame element is a piece of furniture, preferably and at least partially made of wood, formed of two parallel vertical uprights joined together and held at a constant distance by one or more cross-members and/or by various equipment or inserts such as shelves, display racks, or book stands, the end of a mezzanine, storage boxes, safety rails, adjustable floor, etc.

Through the use of the equipment mounted on frame elements such as described hereinabove, a furnished space can be composed, the elements fulfilling, in addition to their support role, a separating role in the room.

Up until now, the frame elements were either placed one next to another, or fixed together using rods provided on the lateral uprights and bolted.

The major drawback lies in the difficulty, with current fixtures, in modifying or choosing the relative angular positions of two frame elements with respect to each other.

SUMMARY OF THE INVENTION

The present invention overcomes this drawback by means of a hinge for articulatable elements, particularly for a modular element characterized in that it includes, on the one hand, two articulation elements of identical profile placed in converse relative positions, each one traversed by a bore and, on the other hand, two locking rods, each one including two bosses designed each to be placed in a bore of two distinct articulation elements.

The advantages, roles and performance of the invention are numerous, and especially:

possibility of aligning the frame elements or of arranging them at a sharp and/or re-entrant angle, possibility of modifying the arrangement of the frame elements which was chosen initially, possibility of adding other frame elements to those initially installed, possibility of modifying the function of the frame element without modifying its arrangement in the assembly, possibility of modifying the height of the mezzanine floor without dismantling the frame element or modifying its place in the assembly, standardization of components, enhanced aesthetic appearance.

BRIEF DESCRIPTION OF THE DRAWINGS

The invention will be better understood with the aid of the description which follows, given with reference to the following appended figures.

DETAILED DESCRIPTION OF THE INVENTION

Figure 1:
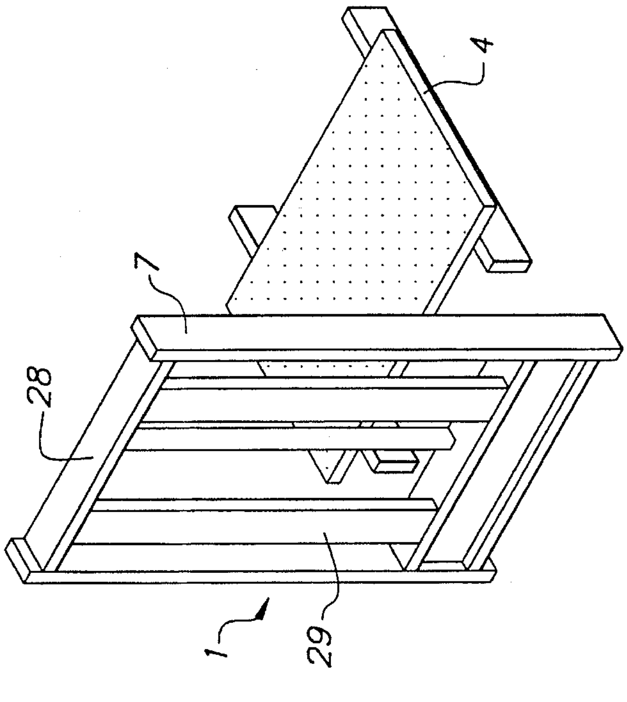
FIG. 1 is an overall view of a frame element intended to receive a floor.
Figure 2:
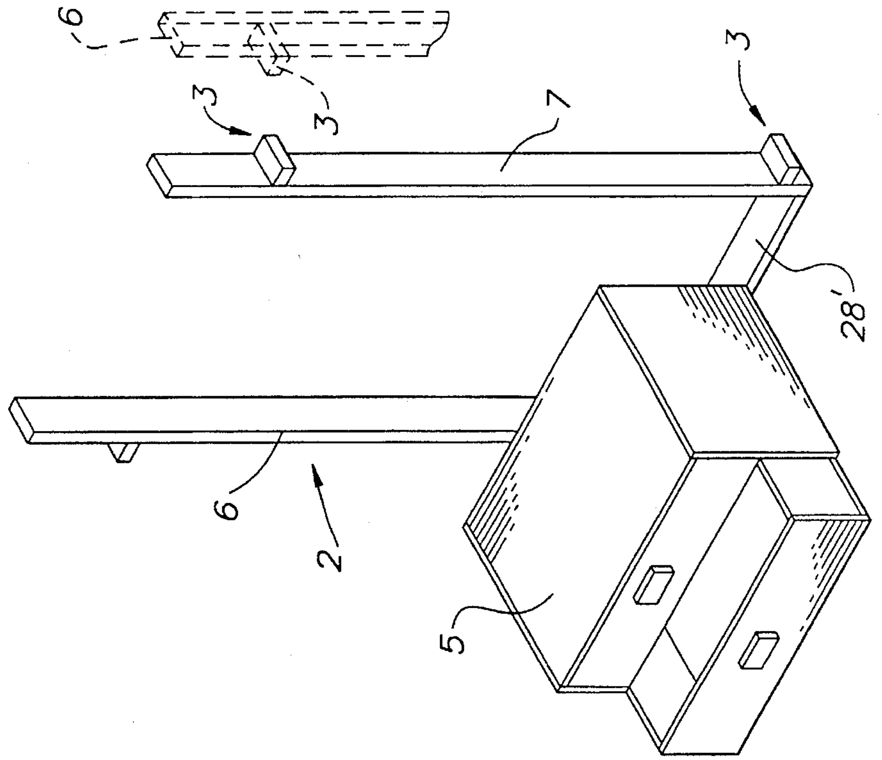
FIG. 2 is an overall view of a frame element intended to receive a chest of drawers.
Figure 3:
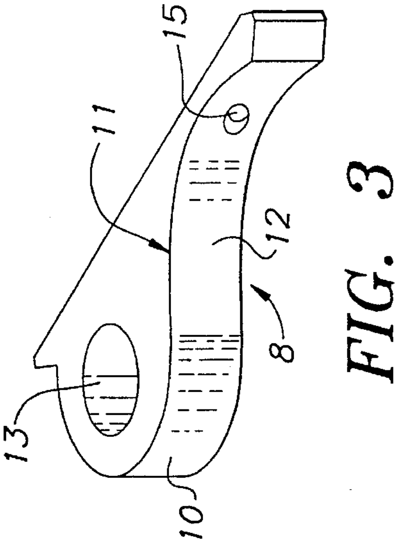
FIG. 3 is an overall view of an articulation piece of a hinge according to the invention.

FIGS. 1 and 2 show two non-limiting examples of frame elements (1, 2) for modular furniture on which can be fixed, to the lateral uprights (6, 7), modular hinges (3) represented diagrammatically in FIG. 2. By way of example they receive respectively a floor (4) and a chest of drawers (5). Various elements such as cross-members (28, 28') or longitudinal members (29) provide, possibly in conjunction with the equipment (4, 5), the rigidity and width of the frame element.

To each lateral upright (6,7) are preferably fixed two hinges (3), one close to the foot and the other at a height allowing easy and direct access for the fitter.

Figure 7:
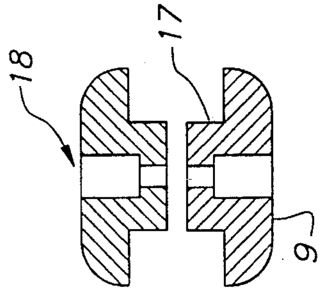
FIG. 7 is a transverse cross-sectional view of the locking rod of FIG. 6.
Figure 8:
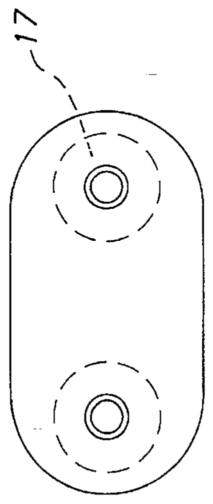
FIG. 8 is a top view of the locking rod of FIG. 6.
Figure 5:
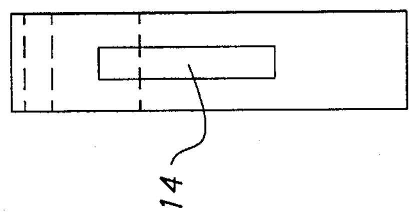
FIG. 5 is an end view of two interlocking articulation pieces.
Figure 6:
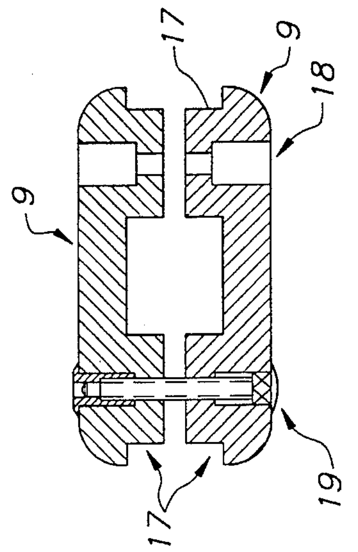
FIG. 6 is a longitudinal cross-section view of a locking rod for the articulation pieces of FIGS. 4 and 5.

Each hinge (3) is comprised of two identical articulation elements (8) which can be interlocked with one another (see FIG. 4), and which are fixed onto two successive frame elements (6,7), and of two locking rods (9) (see FIGS. 6 to 8).

Figure 4:
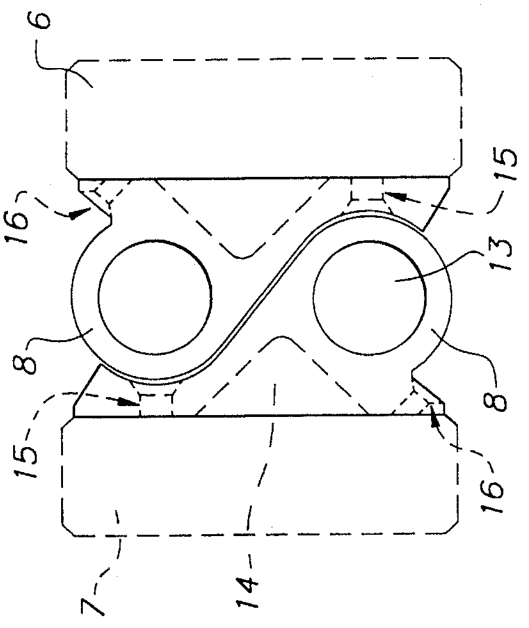
FIG. 4 is a top view of two interlocking articulation pieces.

Each articulation element (8) has a "semi S" shaped profile with a lateral wall which has a first convex portion (10) traversed by a bore (13) extended by a slope (11) and ending in a concave portion and partial cylindrical wall (12) of radius of curvature identical to that of the convex portion (10) so as to allow two articulation elements (8) to be interlocked in converse relative positions with their external surfaces in abutting relation (termed also top-to-tow) as in FIG. 4. The inclination of the slope (11) is, for example, 45°.

Each element (8) includes fixing means, for example two bores (15, 16) which, for reasons of aesthetics, space, and fitting, have been provided respectively at the center of the concave wall (12) perpendicular to the direction of the upright (6, 7) and on a cut side of the end adjoining the convex part (10). For reasons of aesthetics and of safety the ends of the element (8) are formed of cut sides.

The elements (8) are, for example, made from injected plastic with a recess (14).

With reference to FIGS. 6 to 8, each locking rod (9), for example made of wood, includes two bosses (17) each of external diameter less than the diameter of the bores (13) and the spacing of whose centers defines a constant spacing between the centers of the bores (13).

Thus, two rods (9) can be interlocked on either side of a set of elements (8) such as that of FIG. 4 where the elements (8) are applied top-to-toe against one another.

Each rod further includes tow bore-tapping assemblies (18) along the axis of each boss and passing through the rod.

The overall height of the two bosses (17) facing one another is less than the height of the bore (13) in which they are placed so that the articulation elements (8) can be locked in position by clamping the two rods using any suitable means passing through them, for example using screws (19).

By partially or totally unscrewing the means (19) the relative spacing between two successive uprights (7, 6) and between the two frame elements which bear them can be slightly modified, as can their relative orientation. It is also possible to align them as in the case of FIG. 4.

Figure 9:
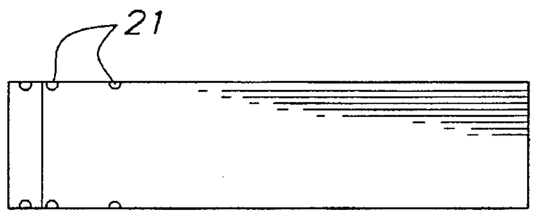
FIG. 9 is a side view of an articulation element having angular prepositioning members.
Figure 10:
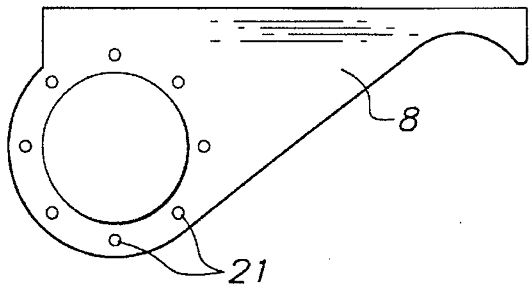
FIG. 10 is a top view of the articulation element of FIG. 9.
Figure 11:
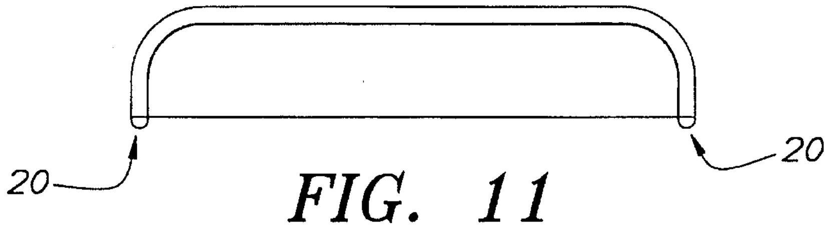
FIG. 11 is a side view of a complementary locking rod for the articulation element of FIGS. 9 and 10.
Figure 12:
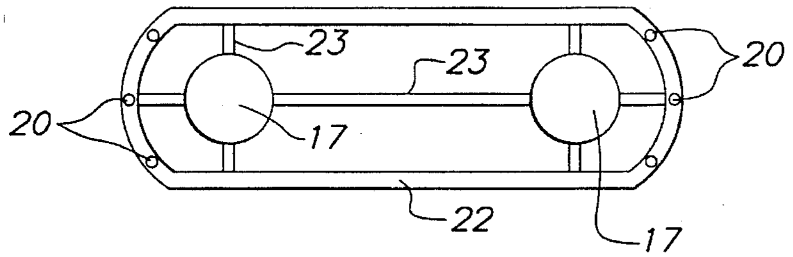
FIG. 12 is a bottom view of the locking rod of FIG. 11.

Furthermore, means may be provided for angular prepositioning of the frame elements as for example those represented in FIGS. 9 to 12. In FIGS. 9 and 10 a plurality of pegs (20) attached under the locking rods (9) and at each of its ends, are housed in cavities (21) of complementary shape evenly distributed in a circle about a bore (13) of an articulation element (8). In FIGS. 11 and 12, pegs (20) are joined onto a peripheral rib (22) of the rod, internal ribs (23) providing the strength of the assembly.

It will be possible to envisage, for example on one upright (7) of FIG. 2, to add one or two, or several, articulation elements to join the frame element (2) to one or more other frame elements which are represented in phantom. If desired, these other elements may be oriented differently.

It would also be possible to envisage connecting frame elements located at different levels or heights and/or to use them to change a surface for separating a room, for example.

It would equally be possible to envisage variants for the locking rod, for example variants in shape, and variants in the spacing means for defining the distance between the centers.

A hinge according to the invention applies in a non-limiting way to the modular furniture formed of frame elements.

What is claimed is:

1. A hinge assembly for articulatable elements, including frame elements of modular furniture, comprising:

paired articulation elements including cooperating external lateral surfaces, each having an identical semi-S-shaped profile, wherein the articulation elements are placed in converse relative positions so that the respective external lateral surfaces are in abutting relation, for allowing movement during installation, wherein each semi-S-shaped profile has a convex cylindrical portion having a radius of curvature and extended to a concave cylindrical portion having a radius of curvature which corresponds to the radius of curvature of the convex cylindrical portion, and wherein each convex cylindrical portion is traversed by a bore; and a hinge including two locking rods, and spacing means connecting the locking rods and defining a constant distance corresponding to a distance defined between the bores of the paired articulation elements.

2. The hinge assembly of claim 1 wherein the spacing means includes two bosses for engaging the bores of the paired articulation elements, and clamping means traversing the bosses.

3. The hinge assembly of claim 1 wherein each of the articulation elements includes at least one means for fixing the articulation element to an upright member.

4. The hinge assembly of claim 1 wherein the articulation elements include means for fixed angular positioning relative to one another.

5. The hinge assembly of claim 4 wherein the angular positioning means includes a plurality of pegs extending from the locking rods for engaging a plurality of cavities in the articulation elements.

6. The hinge assembly of claim 5 wherein the cavities are of a shape complementary to the pegs, and are evenly distributed around the bores of the articulation elements.

7. An articulatable element for frame elements, including frame elements of modular furniture, including uprights and a hinge fixed to each of the uprights, the hinge comprising:

paired articulation elements including cooperating external lateral surfaces, each having an identical semi-S-shaped profile, wherein the articulation elements are placed in converse relative positions so that the respective external lateral surfaces are in abutting relation, for allowing movement during installation, wherein each semi-S-shaped profile has a convex cylindrical portion having a radius of curvature and extended to a concave cylindrical portion having a radius of curvature which corresponds to the radius of curvature of the convex cylindrical portion, and wherein each convex cylindrical portion is traversed by a bore; and a hinge including two locking rods, and spacing means connecting the locking rods and defining a constant distance corresponding to a distance defined between the bores, wherein the spacing means includes two bosses for engaging the bores of the paired articulation elements, and clamping means traversing the bosses.

8. The frame element of claim 7 wherein each of the articulation elements includes at least one means for fixing the articulation elements to the uprights.

9. The frame element of claim 7 wherein the articulation elements include means for fixed angular positioning relative to one another.

10. The frame element of claim 9 wherein the angular positioning means includes a plurality of pegs extending from the locking rods for engaging a plurality of cavities in the articulation elements.

11. The frame element of claim 10 wherein the cavities are of a shape complementary to the pegs, and are evenly distributed around the bores of the articulation elements.

* * * * *